(12) United States Patent
Hammond (10) Patent No.: US 7,068,643 B1
(45) Date of Patent: Jun. 27, 2006

(54) EXTENSIBLE INTERACTIVE VOICE RESPONSE

(75) Inventor: Dan Hammond, Dallas, TX (US)

(73) Assignee: Intervoice Limited Partnership, Reno, NV (US)

( * ) Notice: Subject to any disclaimer, the term of this patent is extended or adjusted under 35 U.S.C. 154(b) by 928 days.

(21) Appl. No.: 09/705,281

(22) Filed: Nov. 3, 2000

(51) Int. Cl.
*H04L 12/66* (2006.01)
*H04L 12/28* (2006.01)

(52) U.S. Cl. .................. 370/352; 370/401; 379/88.17

(58) Field of Classification Search ............. 370/352, 370/401, 354, 356; 379/67.1, 88.17, 88.18; 704/246, 258, 270
See application file for complete search history.

(56) References Cited

U.S. PATENT DOCUMENTS

| 6,195,357 | B1 | | 2/2001 | Polcyn | 370/401 |
|---|---|---|---|---|---|
| 6,327,363 | B1 | * | 12/2001 | Henderson et al. | 379/265.01 |
| 6,418,199 | B1 | * | 7/2002 | Perrone | 379/88.01 |
| 6,430,174 | B1 | * | 8/2002 | Jennings et al. | 370/352 |
| 6,512,818 | B1 | * | 1/2003 | Donovan et al. | 379/88.18 |
| 6,556,997 | B1 | * | 4/2003 | Levy | 707/10 |
| 6,721,705 | B1 | * | 4/2004 | Kurganov et al. | 704/270.1 |
| 6,753,884 | B1 | * | 6/2004 | Finch et al. | 715/762 |

* cited by examiner

*Primary Examiner*—Duc Ho
(74) *Attorney, Agent, or Firm*—Fulbright & Jaworski LLP (57) ABSTRACT

In implementing an interactive voice response mechanism, a communication device establishes a communication connection with an application server. Application logic on the communication device, which may pre-exist on the device or be downloaded from the application server, defines at least one voice response application. The communication device includes a processor that operates to execute the application logic and locally administer the voice response application. Therefore, the voice response application is executed on the communication device instead of in a centralized interactive voice response unit (IVR).

80 Claims, 5 Drawing Sheets

*FIG. 6*

EXTENSIBLE INTERACTIVE VOICE RESPONSE

RELATED APPLICATIONS

Reference is hereby made to the following co-pending, commonly assigned, U.S. Pat. No. 6,195,357, entitled, "INTERACTIVE INFORMATION TRANSACTION PROCESSING SYSTEM WITH UNIVERSAL TELEPHONY GATEWAY CAPABILITIES," the disclosure of which is incorporated herein by reference.

TECHNICAL FIELD

This invention relates to interactive voice response systems and, more particularly, to a voice response system that has the capability of being extended for local execution on a telephone unit or communication device.

BACKGROUND

Interactive voice response systems (IVRs) are well-known and well-used by corporations and governmental entities alike. In many popular applications, IVRs allow such entities to handle numerous incoming calls from consumers, employees, or constituents without requiring a prohibitively expensive number of phone operators. Companies may typically conserve operator resources for use with only the most complex tasks by off-loading simple informational tasks to the automated IVRs.

For example, the banking industry has made great use of IVR technology to conserve and reduce the expense of operator resources. Many bank customers call into a bank to find out simple items of information, such as account balance and last recorded deposits or withdrawals. This type of information is easily retrieved using the bank's database. An IVR may generally be programmed to answer the customer's phone call, determine the complexity of the information desired by the customer and then either present such simple retrieved information as account balance or account activity to the user using synthesized or pre-recorded voice messages, or transfer the customer to a live operator to handle the more complex tasks. This automation of the simple tasks relieves the operators from inefficient application and conserves their resource for the more complex tasks.

In general, modern IVRs were developed during the evolution and advancement of telecommunication networks and equipment. In early networks, most calling service functionality was built into telephone switches. However, because of the enormous expense of telephone switches, advances in calling services were typically delayed until the scheduled addition of new switches and/or replacement or upgrade of existing switches. Service providers typically had to wait until the equipment manufacturers determined the appropriate time to add such calling service functionality to the switches. This limitation generally prevented individual service providers from offering competitive or innovative features without most other providers offering the same switch-resident features.

As switching technology became more and more computerized, computers were connected to the switches and given portions of telephone services to perform in conjunction with the switches. The extension of telephone network functionality to these peripheral computers created an intelligent network (IN) allowing many of the functions previously executed by the switches to be performed by the peripheral computers. As more of the telephone services and functionality was extended to the peripheral computers, the new network architecture was renamed advanced intelligent network (AIN) architecture. The development of AIN architecture generally increased the availability of calling services, such as call waiting, call forwarding, and even interactive voice response. The services, thus, began to move from large and expensive telecommunication switches, to the new telephone system integrated computers now designated service control points (SCPs), intelligent peripherals (IPs), and service nodes (SNs).

SCPs and IPs are basically different hierarchical layers of the peripheral computers that were connected and integrated with the switching network. SCPs and IPs typically have call switching functionality, but also have the processing power to handle user voice and data input and make decisions based on this user input. Switches generally route calls to SCPs, which use IPs to perform many of the simple tasks, such as voice prompting or digit collection. In contrast, SNs are self-contained service providers that typically operate autonomously. A switch routes a call to an SN for services such as voicemail or fax server, which the SN performs without further delegation or input from the switch. Thus, much of the calling service functionality has been extended to peripheral computer/servers external to the switches in the AIN architecture.

Most IVRs are connected into the public switched telephone network (PSTN) in order to facilitate their call handling functions. With the increase in asynchronous communication facilities, such as the internet protocol (IP) network, IVRs will need to include the capability of providing voice response services to such asynchronous communication formats as voice over IP (VoIP). One such IVR system is disclosed in the aforementioned co-pending, commonly-assigned, U.S. Pat. No. 6,195,357, entitled, "INTERACTIVE INFORMATION TRANSACTION PROCESSING SYSTEM WITH UNIVERSAL TELEPHONY GATEWAY CAPABILITIES." However, because VoIP and other asynchronous telecommunication formats are not yet widespread, the majority of IVR applications are still overwhelmingly synchronous and connect to the PSTN.

IVR capacity is typically limited by the number of ports installed in the system. The ports connect the IVR to the PSTN. For example, an IVR manufactured with only one port, may only be able to handle one phone call at a time. Because telephone calls on the PSTN are typically circuit-switched, synchronous connections, an entire circuit path is reserved for the phone connection for the duration of the call. Even when nothing is being transmitted between callers, the circuit generally remains open and, thus, a connected IVR port will usually remain busy for the duration of the call or, at least, the duration of the voice application executed by the IVR. Once the voice response application has been completed, with the phone call either handled or forwarded to the appropriate employee or agent, the IVR may be able to answer the next call as soon as the port is made available. Therefore, IVRs are generally manufactured and customized according to the buyer's expected call traffic.

Typically, IVRs are more expensive with more ports added to the system. Large capacity systems are, thus, usually more easily afforded by larger companies. However, even large companies may not generally be willing to spend a very large sum of money for an IVR system with the total number of ports required to handle the company's expected peek call volume. Thus, IVRs are typically purchased considering only average call volumes. While many consumer's calls will be answered by these IVRs, there will still be occasions when the consumer's call is placed on hold for a long time, or, even worse, the call is not answered at all.

Another disadvantage of the necessity of holding ports and circuits open is the expense generally connected with the open telephone circuit, especially when a wireless telephone is connected to a traditional IVR application. While the cost of wireless communication is falling, users still typically pay to connect to the wireless network, even for calls to the user.

In consideration of the limitations of the current technology in IVRs, it would be desirable to have an IVR application that did not have a capacity limited by the number of ports installed on the IVR system.

It would be a further advantage to have an IVR system that was not required to maintain a circuit connection between the calls and the calling service.

SUMMARY OF THE INVENTION

The present invention is directed to a system and method for an extensible interactive voice response application comprising an application repository that stores various application logic and information thereon. The application logic is used for defining at least one voice response application resident on the repository. The system also works in conjunction with communication devices for establishing connections with the application repository. According to a preferred embodiment of the present invention, when a communication device initiates its connection with the application repository, the repository downloads application logic, or portions thereof, to the communication device to facilitate operation of IVR functions on the communication device. The preferred embodiment application logic may define operations including voice play and/or record, text-to-speech, voice recognition, dual tone multiple frequency (DTMF) input, and/or display multimedia output. Accordingly, the communication device should preferably include memory and a processor capable of executing the downloaded application logic and locally executing the particular voice response application. It should be noted, of course, that application logic of the present invention may select or enable particular operations based on the feature set of the particular communication device. Similarly, the application logic may be provided to the communication device in modules or executable portions to accommodate limitations of the communication device's resources and/or to provide efficient operation.

As the communication device executes the voice response application, it may play audible voice cues according to the particular application. A user may enter responses to the voice cues by speaking or entering information using DTMF or other data input format. Depending on the users responses and requests, the communication device may speak or display responsive information to the user. The responsive information may preferably have been downloaded along with the application logic or, after the communication device re-establishes a connection, may be retrieved from the application repository through internal or external sources.

Interaction of the caller and the application logic may provide functionality such as that of a more typical voice response unit (VRU), i.e., a caller may retrieve banking information without requiring the service provider to dedicate ports to the particular callers. Moreover, the interaction of the caller and the application logic may provide heretofore unavailable functionality. For example, application logic of a preferred embodiment of the present invention may define an Internet voice browsing session allowing a caller to freely access any information available over the Internet from a communication device such as a mobile or landline telephone.

The implementation of a preferred embodiment of the present invention provides several potential benefits over existing IVR systems. Speech recognition and voice processing executed on the communication device in the preferred embodiment will preferably provide more accurate results due to the voice input being provided at the source of the processing. Furthermore, with the local processing, delay time is preferably reduced. The extensible IVR system is advantageously more scalable than traditional IVR systems because the extensible system does not rely on IVR ports to control, and limit, capacity. Moreover, the extensible IVR system leverages the existing IP infrastructure, which continues incredible growth due to the recent explosion in Internet accessibility demand.

In addition, the remote communication devices may remain in communication with the application repository without tying up an expensive port, or otherwise precluding another communication device from the accessing application repository. Thus, processing and system interaction may be going on with several communication devices at the same time. For example, a mobile phone may remain in communication with the repository through a suspended socket connection to implement the voice response application. At the same time, one or more other mobile or landline phones (or any other compatible communication device) may preferably be downloading from or interacting with the repository through other asynchronous, multiplexed socket connections on the same line. At any required time, the mobile phone with the suspended socket connection may re-activate the suspended connection to interact further with the repository without requiring the suspension or deactivation of the other connections.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
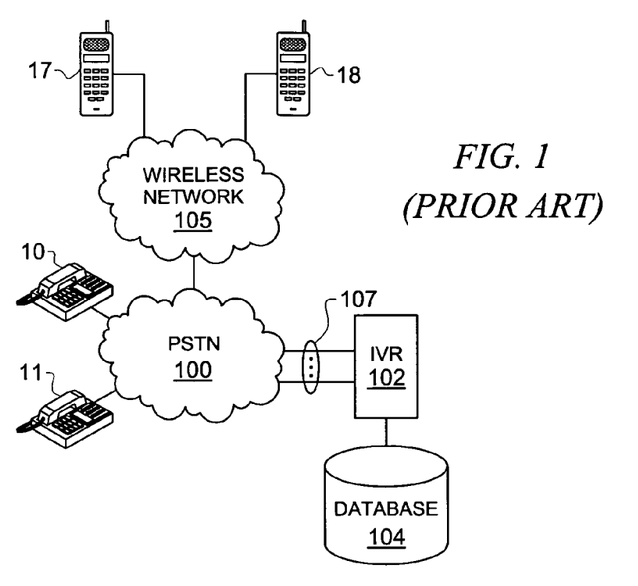
FIG. 1 is a high-level block diagram illustrating a prior art IVR system.

FIG. 1 illustrates a typical prior art IVR system. Customers usually call into IVR 102 over PSTN 100 using traditional telephones 10 and 11, or standard mobile phones 17 and 18 over wireless network 105 connected through PSTN 100. IVR 102 is typically connected to PSTN 100 using trunk 107, which generally comprises a collection of individual phone lines usually corresponding to the number of ports available on IVR 102. As customers call into the system, IVR 102 answers the calls and runs a voice response application for each caller. IVR 102 plays pre-recorded or synthesized voice messages and voice prompts, obtains input from the caller either through DTMF or spoken responses. Each voice message is played by IVR 102 and transmitted across PSTN 100 or PSTN 100 and wireless network 105 to the caller at any of phones 11 and 12 or mobile phones 17 and 18.

In the operation of the voice response application, IVR 102 will generally search database 104 for information responsive to requests made by the caller. In the example given above of the banking application, a caller could request to know the available balance of his/her account. IVR 102 would typically receive and interpret the request from the caller, and then search database 104 for the account balance using input from the caller, such as account number, password, etc. When IVR 102 finds the responsive data, it generally audibly communicates the account information to the caller. In order to communicate the responsive information to the caller, IVR 102 may either play pre-recorded voice messages or use synthesized text-to-speech technology. The technique used will usually be determined by the programming and capabilities of IVR 102.

For complex interactions, IVR 102 generally forwards a caller to an agent or employee typically stationed at a computer-telephone integrated workstation (not shown). Once the caller has been forwarded to the agent or employee, the port into IVR 102, on which the caller interacted with the voice response application, will usually be released and available to take the next call.

Figure 2A:
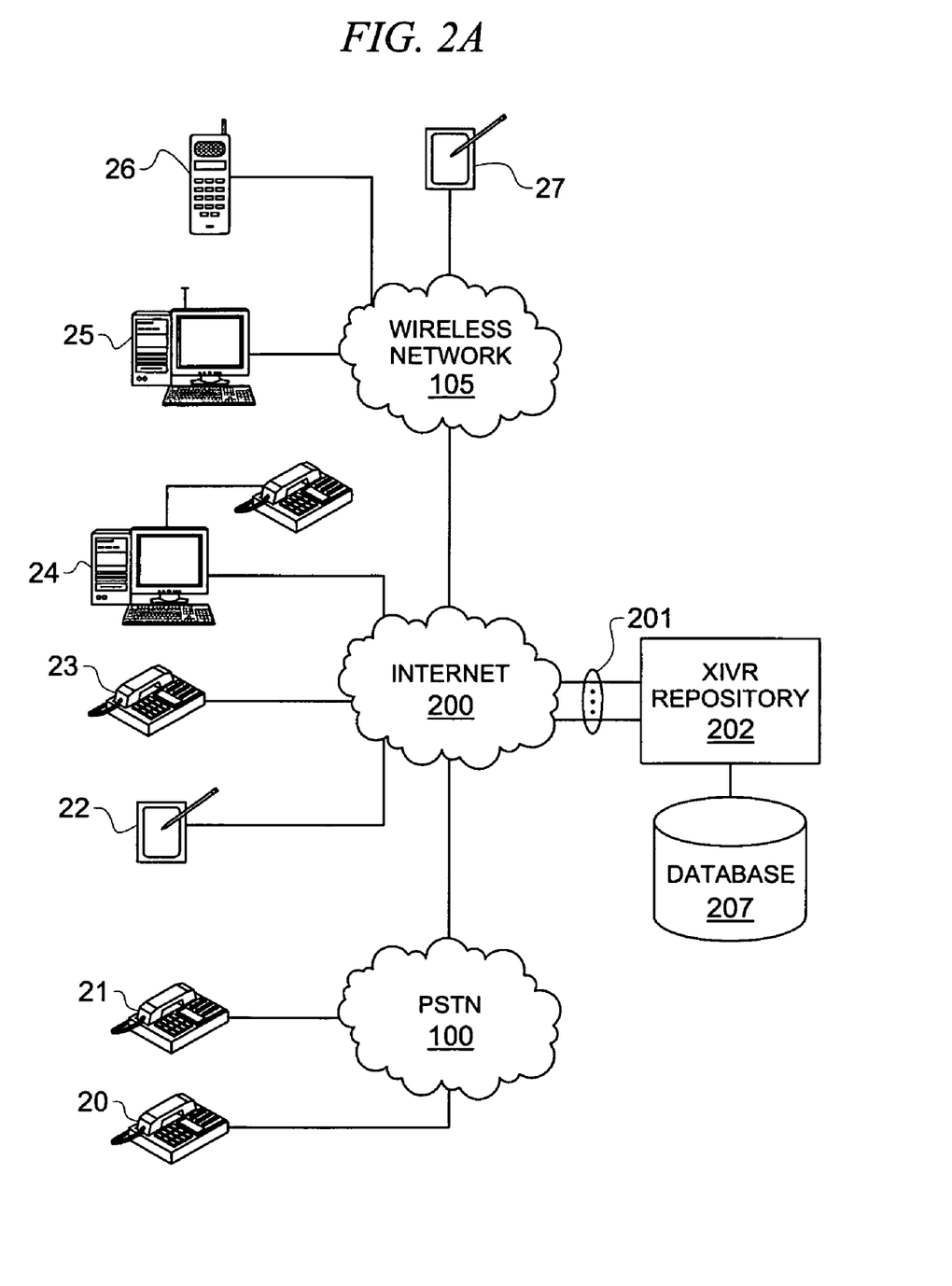
FIG. 2A is a high-level block diagram illustrating a preferred embodiment of the present invention.

FIG. 2A illustrates an eXtensible IVR (XIVR) system according to a preferred embodiment of the present invention. The concept of an extensible system is based on running a system application, or portions thereof, on an external device. In the context of an IVR, an XIVR allows the voice response application to run locally on the accessing communication devices. In order for an XIVR system to operate, the accessing communication devices should preferably have, or have access to, basic processing capabilities and memory for storing the executable application logic.

In the preferred embodiment of the present invention shown in FIG. 2A, XIVR repository 202 is connected to a data network, Internet 200, using data connections 201. "Callers" preferably access the system through an asynchronous data network, such as Internet 200. The access may be implemented in any manner available to access Internet 200. For wireless users, a "caller" may access XIVR repository 202 using mobile phone 26, laptop computer 25, with wireless modem capabilities, and/or hand-held computer 27, also with wireless communication ability. The wireless users preferably connect to Internet 200 over wireless network 105, and then to XIVR repository 202 over data connections 201. Users may also preferably access XIVR repository 202 through direct connections to Internet 200 using computer 24, internet telephone 23, and/or hand-held computer 22; or may connect to Internet 200 via PSTN 100 using compatible phones 20 and 21.

Through its connection to Internet 200, XIVR repository 202 may be addressed using an Internet protocol (IP) layer address or uniform resource locator (URL). As users access XIVR repository 202, repository 202 preferably downloads the voice response application logic, or portions thereof, to the user's communication device. Because the connection is made through Internet 200 and data connections 201, all data is advantageously transmitted asynchronously between XIVR repository 202 and the user's communication device. This preferably allows more than one user to be connected to XIVR repository 202 at the same time over a single line of data connections 201, thus preferably reducing the total number of data connections per user generally required for XIVR repository 202.

Once the application logic has been downloaded, the communication device preferably runs the application locally. Using mobile phone 26 as an example, XIVR repository 202 downloads the application logic, or portions thereof, to mobile phone 26. When the application logic has been downloaded, the socket connection with XIVR repository 202 is either closed or suspended pending any further interaction with XIVR repository 202. Mobile phone 26 then runs the application. Alternatively, mobile phone 26 may begin running the voice response application before the application logic, or portions thereof, is completely downloaded. Additionally or alternatively, initial portions of the voice response session may preferably come from XIVR repository 202 directly, while the application is loading to mobile phone 26. Such features would preferably allow a more seamless interface with the user. Voice messages and prompts are preferably played for the user directly over mobile phone 26's speaker. The user may respond as usual to the voice messages and prompts.

In the preferred embodiment of the present invention, the user's responses will preferably be processed at mobile phone 26. Therefore, the user's response messages will not have to be transmitted back to XIVR repository 202, subjecting the audio to signal degradation caused by the noise injection typical in such transmission. Alternatively, mobile phone 26 may transmit all or some inputs from the user to XIVR repository 202 for processing. For example, menu navigation responses may be processed locally, while the ultimate request for data is processed at XIVR repository 202 or other coupled systems.

For simple applications, the downloaded application logic may preferably include a table or small database of various optional answer messages for the voice application to use. For example, with a movie-times voice application, the different movie selections and times may be included in the application logic initially downloaded to mobile phone 26.

Therefore, when a user requests the times for a particular movie at a particular theater, the voice application locally runs through a look-up table downloaded with the application logic to find and play the corresponding start times for the requested movie. Depending on the XIVR application or the memory considerations used when designing the system, the answer messages may comprise any combination of graphics, text, or aural information. The visual information, i.e., graphics and text, may preferably be presented on a communication device's display, while the aural information may preferably comprise digitized, pre-recorded voice files and/or data files used with text-to-speech synthesis within the application logic or within the host communication device. The aural information may preferably be presented to the user on a resident speaker or other transducing mechanism.

For more complex applications, or applications that handle sensitive data, such as financial information, mobile phone 26 would preferably establish additional, subsequent connections, or simply re-activate a "suspended" socket connection to XIVR repository 202 in order to retrieve the requested information. Referring again to the banking example, after the user requests balance information, mobile phone 26 preferably processes the verbal response, determines the action requested, and then preferably accesses the socket connection to XIVR repository 202 again. Because the next connection is to obtain further information corresponding to the downloaded voice response application, a code may preferably be added to the header of the data transmission indicating to XIVR repository 202 that the following socket connection is a "continued" connection. This code advantageously prevents XIVR repository 202 from attempting to download the initial application logic again.

The data transmitted from mobile phone 26 would also preferably contain the processed request from the user to obtain the user's account balance. XIVR repository 202 preferably uses the request and other transmitted user input to find the account information in database 207. XIVR repository 202 will then preferably package the responsive information and send it back to mobile phone 26 for presentation to the user. The packaged response may preferably be encrypted and may comprise an audio file for playback on mobile phone 26's audio player, a text file for use in a text-to-speech synthesis process at mobile phone 26, and/or text or graphics files for visual presentation on mobile phone 26's display. Thus, for all requested information that is not downloaded along with the downloaded application logic, mobile phone 26 will re-establish the data connection with XIVR repository 202 to obtain the appropriate responsive information.

Extensible voice response applications preferably may also call other applications resident on XIVR repository 202, or otherwise coupled thereto, as a part of the voice application processing. For example, a stock brokerage application may have several different and extensible functions available for a user to access. However, downloading the entire application may be prohibitively time and resource consuming, for communication devices with limited memory and/or processing capabilities, such as mobile phone 26 and the like. Furthermore, not every user will want to execute all available functions. Therefore, it would be a more efficient use of memory and of the available bandwidth between the communication device and XIVR repository 202 to only load portions of a complete voice response application. In such an application, the different functions may preferably be broken into different executable modules corresponding to available features. Thus, the first downloaded module may preferably include only the functions necessary to check balances and stock prices. It may also have options to buy and sell stocks. When a user selects the option to sell stocks, the downloaded application logic preferably causes mobile phone 26 to re-establish or unsuspend the socket connection with XIVR repository 202 to download the "sell" module. The sell module will preferably replace the initial module in mobile phone 26 and execute its voice messaging and functionality in a similar manner.

With regard to memory resources, it should be noted that a preferred embodiment of the present invention would advantageously manage the application logic stored on XIVR repository 202 in accordance with the memory limitations of the particular communication device connecting to the system. XIVR repository 202 would preferably include software to break down the application logic modules into appropriately-sized sub-modules suitable for running on the limited-memory devices, such as mobile phone 26 or hand-held computers 22 and 27. The system would preferably be able to read the type of connected device through the header data of the connection packets transmitted from the communication device. Upon connection and recognition of a limited-memory device, such as hand-held computer 27, XIVR repository 202 preferably downloads the first executable sub-module sized according to the memory limitations of hand-held computer 27. As the user completes execution of the first sub-module, hand-held computer 27 accesses the data connection socket with XIVR repository 202 and preferably downloads the next executable sub-module. This paging sequence would preferably continue until the application is ended, either by the user or the system.

In an alternative embodiment of the present invention, there may be a desire to connect a user with an agent to handle complex matters or if the user simply desires to speak with a live person. To handle the live agent or operator situation, the voice response application may include a script to establish a voice connection or voice call between the user and an agent. As the script is accessed, the communication device will connect with an agent using the information from within the downloaded application.

In a further alternative embodiment of the present invention, XIVR repository 202 may directly connect an agent to a user by incorporating the universal gateway capabilities of the aforementioned, co-pending, commonly assigned, U.S. Pat. No. 6,195,357, entitled, "INTERACTIVE INFORMATION TRANSACTION PROCESSING SYSTEM WITH UNIVERSAL TELEPHONY GATEWAY CAPABILITIES." XIVR repository 202 may preferably directly connect a user using either a synchronous or asynchronous voice-connection with an agent also using either a synchronous or asynchronous voice-connection. The capabilities described in the above-styled application allows for direct connection of the dissimilar connection types.

Figure 2B:
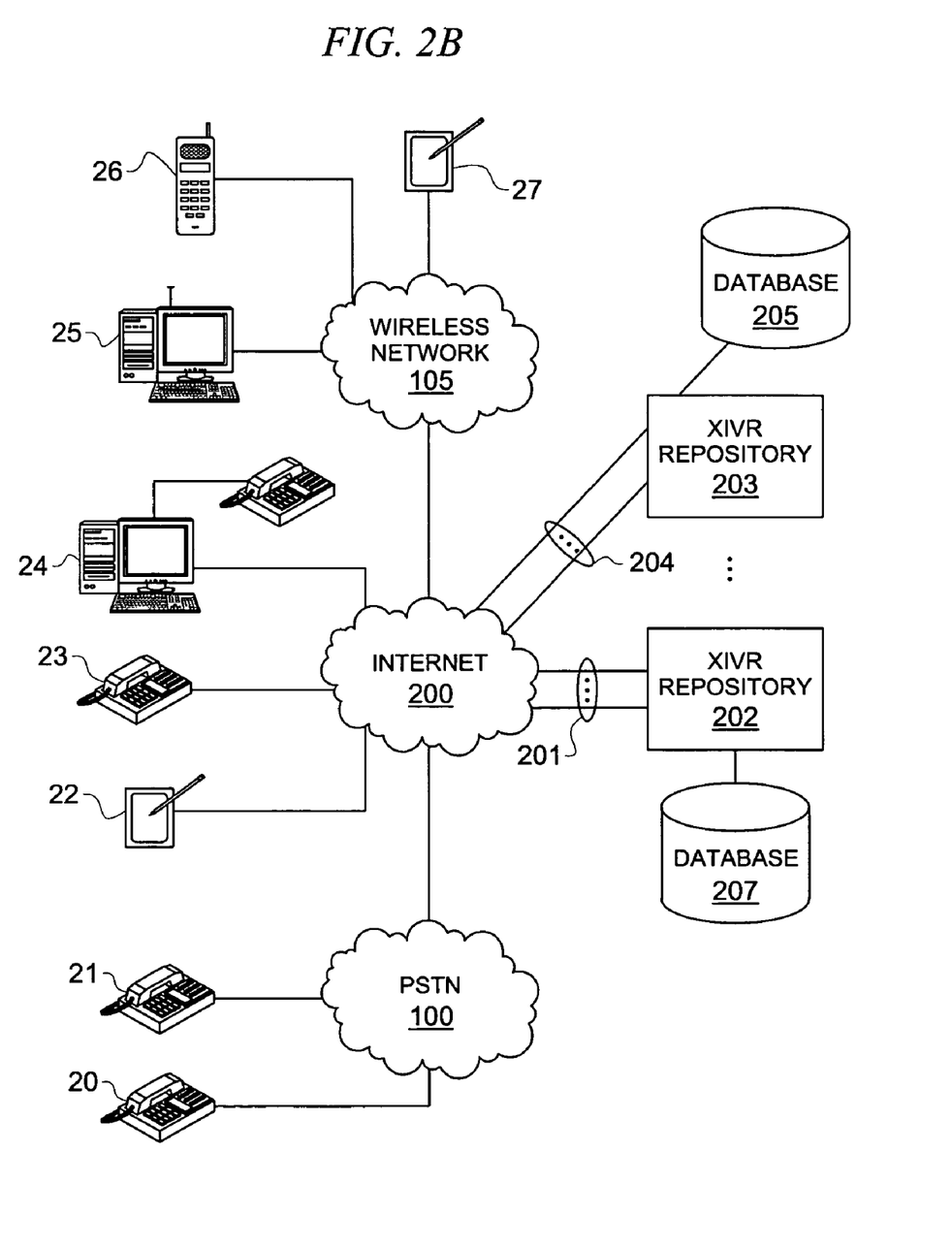
FIG. 2B is a high-level block diagram illustrating a preferred embodiment of the present invention showing multiple XIVR repositories.

In operation of an alternative embodiment of the present invention, a caller may begin an interactive voice response session with one XIVR and then hyperlink to another XIVR to execute or operate another voice application. FIG. 2B illustrates the alternative embodiment of the present invention in which voice application hyperlinking may be used.

For example, a caller using landline phone 21 may preferably access XIVR repository 202 over data links 201 to begin receiving the program code to operate a first voice response application. During the course of running the first application, the caller may preferably be presented a choice or given a hyperlink option to go to a second XIVR to run another voice response application. With reference to the banking example, the first application may give the user an option to open a brokerage account with a related brokerage company. On choosing this option, landline phone 21 preferably establishes a connection with XIVR repository 203 over Internet 200 using data connections 204. XIVR repository 203 preferably downloads the application logic to landline phone 21 for running the brokerage account voice response application. The caller would then preferably interact with the brokerage account application running on landline phone 21, which will then communicate the response data and any other necessary information for opening the brokerage account with XIVR repository 203. Repository 203 will also preferably communicate with database 205 to store and retrieve information needed by landline phone 21 to further operate and complete the brokerage account application.

Figure 3:
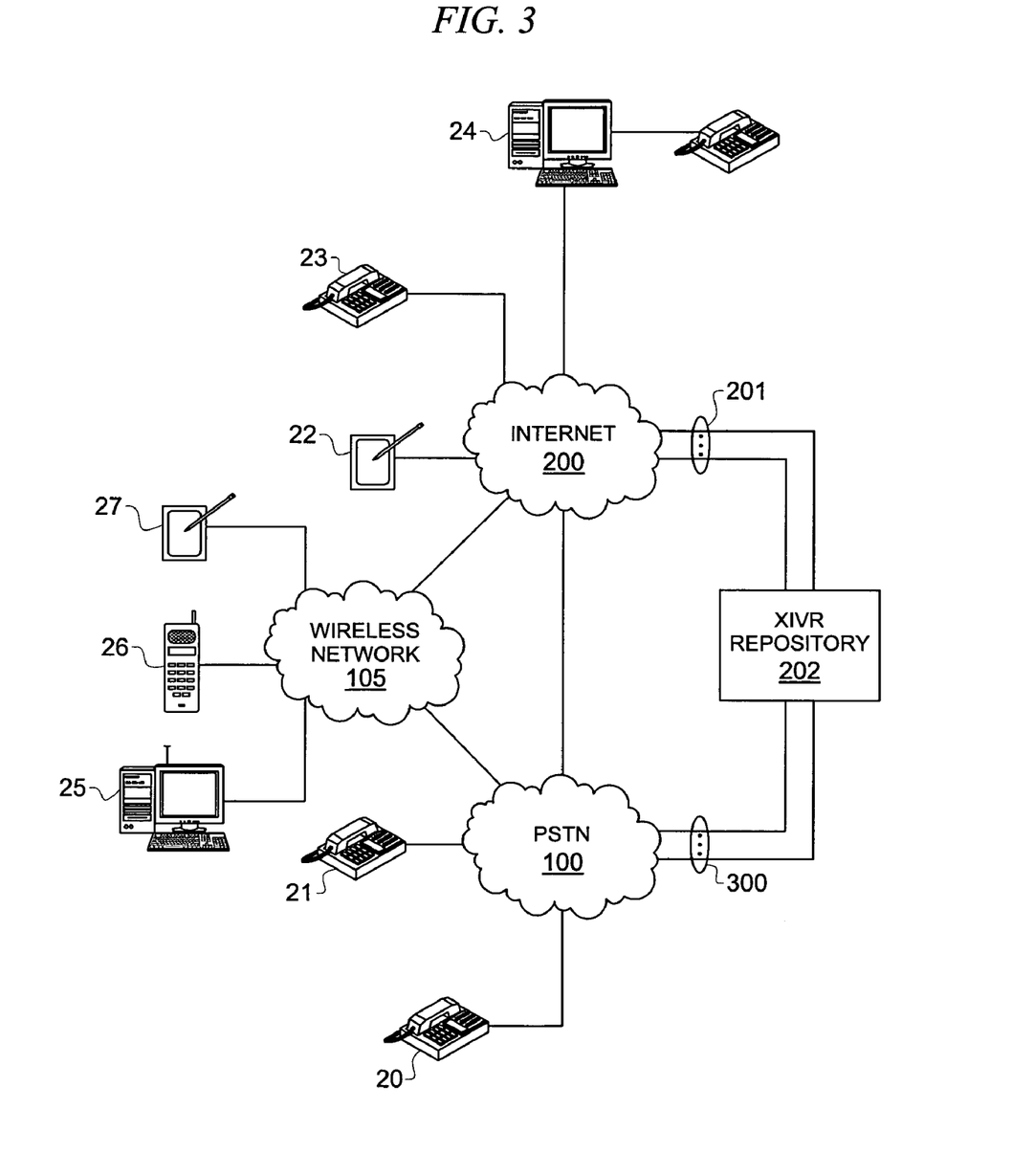
FIG. 3 is a high-level block diagram illustrating an alternative embodiment of the present invention.

FIG. 3 illustrates an alternative embodiment of the present invention configured to initiate a connection with the inventive XIVR 202 using a voice/phone connection. Typical operation of prior art IVR systems begins with a user establishing a voice connection to the IVR. The present alternative embodiment uses a voice connection to initiate the XIVR system. The system is preferably accessed using any one of communication devices 20–27. To initiate the system, the communication device, e.g., mobile phone 26, places a voice call to XIVR repository 202. The wireless connection is processed from wireless network 105 through PSTN 100 to XIVR repository 202 using trunk 300. Trunk 300 connects to traditional ports preferably included on XIVR repository 202.

In operation, mobile phone 26 preferably voice-connects to XIVR repository 202, which initiates a preliminary voice response script. Preferably, through this initial script, all necessary information regarding the target address of mobile phone 26 is advantageously established. Such address information may be gathered either automatically, through calling data such as automatic number identification (ANI), dialed number identification service (DNIS), mobile identification number (MIN), or the equipment serial number (ESN), or manually through question and answer sequences with the user. This initial script may additionally or alternatively solicit information with respect to an application a caller wishes or needs to be implemented by XIVR repository 202. It should also be noted that XIVR repository 202 may have a database of caller associated data. Such a database may contain caller specific information such as IP address or other data information used in establishing the data connection. XIVR repository 202 may then use the calling data, such as the ANI, DNIS, MIN and/or ESN, to cross-reference the database for the appropriate connection address information. Once the address information has been determined, XIVR repository 202 preferably establishes a data socket connection and begins downloading the appropriate modules or sub-modules of the application logic to mobile phone 26 over Internet 200 and wireless network 105 through data connections 201. In order to minimize the delay, the application logic may preferably begin executing on mobile phone 26 prior to the completion of the initial download. This advantageously presents a more linear interface with the user.

It should be noted that while the foregoing examples noted use of mobile phone 26 for the inventive system, the present invention is not limited to operation solely with mobile communication devices. Landline phones 20 and 21 may preferably access and execute the extensible voice response applications from XIVR repository 202 using PSTN 100 and Internet 200 networks to establish a data connection. Moreover, other communication devices such as hand-held computers and desktop or laptop computers may also be used with a preferred embodiment of the present invention.

It should be noted that in the alternative embodiment shown in FIG. 3, XIVR repository 202 may preferably use simultaneous, or duplexed voice and data connections with communication devices 20–27. This would preferably allow XIVR repository 202 to simultaneously, or nearly simultaneously, execute the preliminary voice response script while downloading the application logic to the communication device. For example, phone 21 connecting to XIVR repository 202 and Internet 200 using PSTN 100 may preferably maintain simultaneous voice and data connections with XIVR repository 202 if the user subscribes to digital subscriber line (DSL) technology. Wireless communication devices 25–27 may preferably duplex between voice and data connections with XIVR repository 202, under the current mobile communication systems, such as the time division-based global system for mobile communications (GSM) and the digital code division multiple access (CDMA) systems. In the near future, however, mobile systems will preferably support a simultaneous data and voice connection to XIVR repository 202. The contemplated Third Generation (3G) systems which will utilize developing standards, such as wideband CDMA (WCDMA), and general packet radio service (GPRS), which will overlay a packet-switched network onto the GSM and other time division based systems, each support simultaneous voice and data connections.

Figure 4:
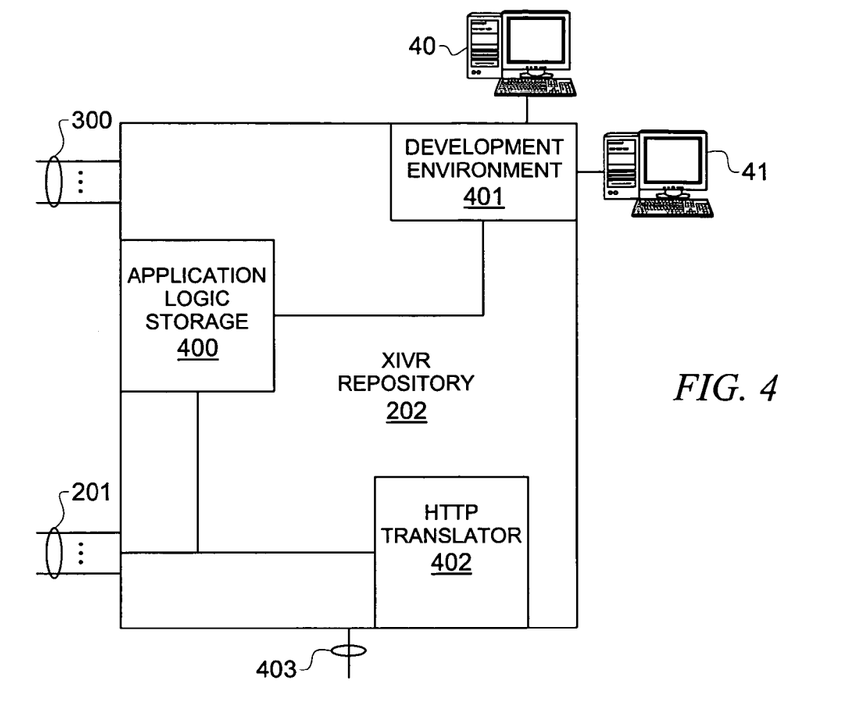
FIG. 4 is a high-level block diagram illustrating the internal operation of an extensible IVR designed according to a preferred embodiment of the present invention.

FIG. 4 shows the unique internal structures of an XIVR repository of the preferred embodiment of the present invention. XIVR repository 202 preferably extends traditional IVR functionality to each connecting communication device. In an alternative embodiment, XIVR repository 202 also preferably provides traditional IVR functionality in order to facilitate the extensible application capability. Thus, XIVR repository 202 comprises much of the same equipment found in traditional IVRs (equipment not shown). However, novel features of XIVR repository 202 provide the ability to transport voice response functionality, through application logic, discrete programs, or the like, to external devices.

Application logic storage 400 preferably comprises memory to store the executable voice response applications. As XIVR repository 202 is contacted through PSTN trunk 300 or data connections 201, executable copies of the application logic are preferably downloaded over data connections 201 to the contacting communication units. The voice response applications are advantageously developed with development environment 401 through computer workstations 40 and/or 41. Unlike traditional IVRs, which may be programmed in proprietary languages generally requiring resident interpreters or compilers, the XIVR system preferably uses an extensible language, which is advantageously transferable to a host processor with the components used to run the given application. Languages such as hypertext markup language (HTML), extensible markup language (XML), VoiceXML, and the like may be utilized in providing the extensibility to program voice response applications for use with XIVR repository 202.

In an alternative embodiment described further below, XIVR repository 202 may also preferably facilitate voice-browsing the Internet. In order to accomplish this function, XIVR repository 202 also preferably comprises HTTP translator 402 (FIG. 4). As XIVR repository 202 browses through the Internet, it reads the HTML web pages and advantageously converts the HTML into a compatible format for a voice response application, such as VoiceXML for example, and/or for interfacing with callers through various ones of communication devices 20–27. The HTTP is then preferably converted into the appropriate transport protocol and the web pages, or portions thereof, are downloaded to the connecting communication device. The translation executed by HTTP translator 402 preferably converts text-to-speech and notes hyperlinks as special voice cues to inform users of the executable links available. Additionally or alternatively, portions of the web site may be visually presented as text or graphics on a display associated with or connected to the communication device. These conversion components are advantageously included in the application logic downloaded to the connecting devices.

It should be also noted that web sites or web pages may preferably be implemented using a compatible extensible voice programming language, such as VoiceXML. Therefore the XIVR system may not always be required to perform translation of incompatible formats or protocols.

Figure 5:
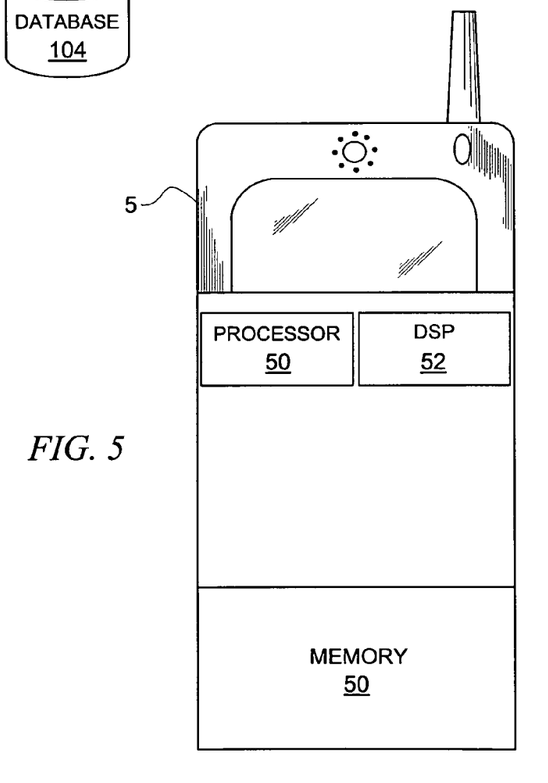
FIG. 5 is a high-level block diagram illustrating the additional features of a communication device compatible with a system according to a preferred embodiment of the present invention.

FIG. 5 illustrates a preferred embodiment communication device compatible with an XIVR system of the present invention. The device represented in FIG. 5 is a mobile telephone. However, it should be noted that various types of communication devices may be adapted to operate with the inventive XIVR system. In addition to the typical equipment found in many communication devices, such as antenna, transducers, displays, etc., mobile phone 5 preferably includes processor 50, digital signal processor (DSP) 52, and memory 51. Traditional mobile phones already have processing units whether programmable, embedded, or application specific. Mobile phone 5 may operate successfully simply by changing the single processor of a traditional phone to a more powerful model. A powerful single process would generally be capable of performing the voice processing features as well as the standard phone features. However, in a preferred embodiment, mobile phone 5 comprises both additional processor 50 and DSP 52 in order to optimize the application execution.

Memory 51 provides storage for the downloaded application logic, response data, reference tables, and/or any other form of data or information used in the execution of a voice response application. With the advances in memory technology, it is possible to place a large amount of memory on a small device with very little power consumption. In fact, the memory may be configured with its own backup power through using an attached battery. In alternative embodiments, small devices, such as phones and hand-held computers may be configured to accept external memory cards such as floppy disks or compact flash-type cards. These small memory units could greatly expand the memory capability of a compatible phone.

It should also be noted that alternative embodiments may be configured to accept external or internal additional processors or memory. In such embodiments, the memory and processor power of such communication devices may be selectively enhanced and/or upgraded.

Figure 6:
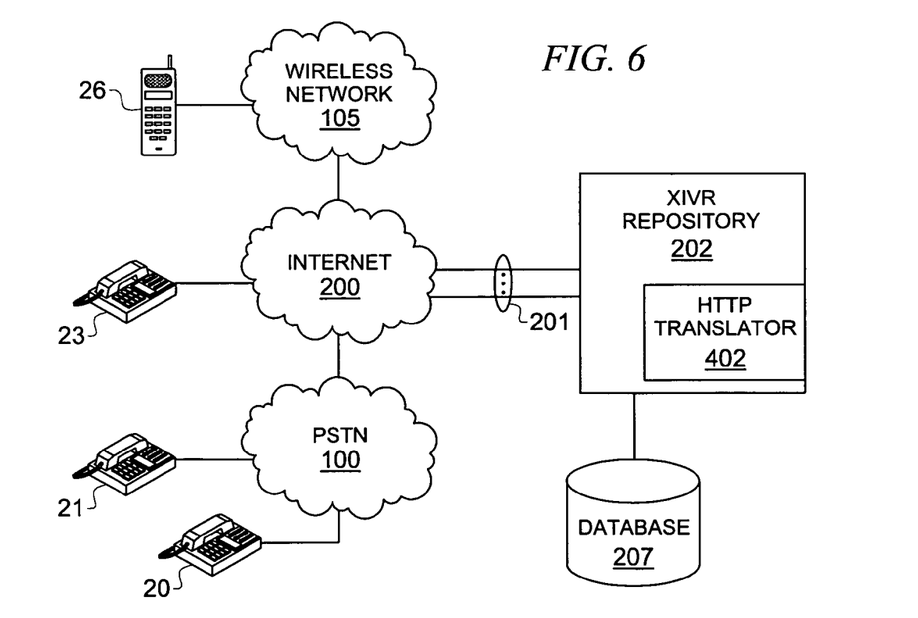
FIG. 6 is a high-level block diagram illustrating an alternative embodiment of the present invention.

FIG. 6 illustrates an alternative embodiment of the present invention configured to provide voice-browsing the Internet. Communication devices 20, 21, 23, and 26 are each phones that typically are not used to browse Internet 200. Mobile phone 26 may be WAP compatible, providing limited access to Internet 200. However, WAP is typically used only with wireless applications, or applications written specifically for WAP-compatible mobile phones, thus not providing full access to available web content. WAP is also browsed exclusively by using keypresses.

In a preferable example of voice-browsing operation, on an alternative embodiment of the present invention, landline phone 20 preferably accesses XIVR repository 202 over data connections 201 through PSTN 100 and Internet 200. XIVR repository 202 may check database 207 to determine whether phone 20 subscribes to the voice-browsing service. If phone 20 subscribes to voice-browsing, the application logic is preferably downloaded and run on phone 20. The application preferably requests the user to speak/spell the URL of the website to access. Additionally or alternatively, a list of favorites may be stored in a user-accessible database disposed either on the communication device or on a database associated with XIVR repository 202. If such a favorites list is disposed on a database associated with XIVR repository 202, repository 202 would preferably download the list to the communication device at the initialization of each application session. Phone 20 preferably returns the URL to XIVR repository 202, which accesses the website through data connections 201. XIVR repository 202 preferably retrieves the HTML code for the website and translates it, if necessary, into a compatible language, such as XML or VoiceXML. XIVR repository 202 then preferably downloads the web page to phone 20, which begins playing and/or displaying the text and hyperlinks from the accessed site.

In one version of this preferred alternative embodiment, XIVR repository 202 may begin translating each of the web pages corresponding to the available hyperlinks on the page downloaded to phone 20. This pre-translation will preferably increase the speed with which phone 20 receives the next web page, if the user chooses one of the hyperlinks. Alternatively, XIVR repository 202 may preferably access available counter or statistical software resident on the target web pages to determine the hyperlinks most likely chosen by a user. The alternative predictive voice-browser will preferably make a statistical choice regarding the resources to expend pre-translating web pages.

It should be noted that in the application of the present invention, the communication device may be configured to semi-permanently store the application logic and/or the information retrieved by the voice response application. Thus, a user would preferably not have to re-access the XIVR system to obtain the same data or information. Once a session has been completed, the communication device would have the information and/or the portion of the voice response application available for the user without requiring a renewed connection to the XIVR system. A user obtaining an account balance would therefore be able to recall the balance locally on the phone until such time as either the user or the communication device erases the corresponding memory. Such a data retention policy may be predefined by the communication device manufacturer, the XIVR system provider, and/or the user. Additionally or alternatively, the user may manually choose an option to erase or save such data or application logic.

It should be noted that while the descriptions of the alternative embodiments of the present invention shown in FIGS. 2, 3, and 6 show data connections with XIVR 202 to the Internet, the present invention may also be connected through other data networks. XIVR 202 may operate internally within a company through the company's intranet. Employees would therefore be able to access the XIVR system at work or from mobile locations by calling into the company intranet.

It should further be noted that the preferred embodiment of the present invention is not limited to connecting with mobile communication devices indirectly through either the Internet or the PSTN. As GPRS systems are installed in wireless networks, it will be possible to asynchronously connect directly to the XIVR system. An XIVR configured to directly communicate with a GPRS-enabled mobile device would also preferably incorporate a wireless communication interface equally compatible with the GPRS system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An interactive voice response system comprising:
an application repository having application logic and information stored thereon, said application logic for defining at least one voice response application;
a communication device for establishing at least one connection with said application repository, wherein said application repository transmits said application logic and a set of potentially responsive information to said communication device responsive to one of said established connections; and
a processor within said communication device to locally execute said transmitted application logic defining at least one voice response application providing responsive information to requests made in said local execution, wherein said responsive information is obtained from said application repository when said set of potentially responsive information does not contain said responsive information.

2. The system of claim 1 further comprising:
a data network interface in communication with said application repository for retrieving said responsive information.

3. The system of claim 2 wherein said data network is the Internet.

4. The system of claim 1 wherein said communication device establishes another connection for transmitting another application in the application repository responsive to said information retrieved by said application repository, said another application in the application repository having another application logic stored thereon defining at least one other voice response application for execution on said communication device.

5. The system of claim 4 further comprising:
translation logic for converting said retrieved information and applications into a format compatible with said application logic.

6. The system of claim 1 wherein said application repository divides said at least one voice response application into one or more selectively-sized, executable sub-modules, wherein a size is selected responsive to memory limitations of said communication device.

7. The system of claim 6 wherein said communication device obtains one of said one or more sub-modules for execution.

8. The system of claim 7 wherein said communication device obtains a next one of said one or more sub-modules after completing execution of said one sub-module.

9. The system of claim 1 further comprising:
a user interface disposed on said communication device for accepting input from a user responsive to said transmitted application logic defining at least one voice response application.

10. The system of claim 9 wherein said processor processes said user input locally according to said transmitted application logic defining at least one voice response application.

11. The system of claim 10 further comprising voice recognition logic.

12. The system of claim 11 wherein said voice recognition logic is disposed permanently on said communication device.

13. The system of claim 11 wherein said voice recognition logic is disposed on said application repository and wherein said voice recognition logic receives digital voice packets from said communication device.

14. The system of claim 9 further comprising:
an audio transducer disposed on said communication device for playing aural segments to said user in accordance with the operation of said transmitted application logic defining at least one voice response application; and
a display disposed on said communication device for presenting visual information to said user in accordance with the operation of said transmitted application logic defining at least one voice response application.

15. The system of claim 14 wherein information responsive to said transmitted application logic defining at least one voice response application is presented on said communication device according to a set of preferences preselected by said user.

16. The system of claim 9 wherein said communication device initiates said application repository connection over a voice connection and receives said information and application logic over a data connection.

17. The system of claim 16 wherein said voice connection comprises a circuit switched network and said data connection comprises a packet switched network.

18. The system of claim 9 wherein said communication device communicates with said application repository using a blended voice and data network.

19. The system of claim 1 wherein said application logic comprises VoiceXML.

20. A method for providing an interactive voice response application to a user on a communication unit comprising the steps of:
establishing an initial connection between said communication unit and a multimedia application repository;
downloading software code defining said interactive voice response application and a set of potentially responsive information to said communication unit from said multimedia application repository;
executing said software code on said communication unit to run said downloaded interactive voice response application; and
providing responsive information to said user responsive to requests made pursuant to said downloaded interactive voice response application;

obtaining said responsive information from said multimedia application repository when said responsive information is not found in said set of potentially responsive information.

21. The method of claim 20 wherein said multimedia application repository obtains said responsive information from one of an internal database and a data network.

22. The method of claim 21 further comprising the step of:
converting said responsive information into a format compatible with said interactive voice response application.

23. The method of claim 20 wherein said downloading step further comprises the step of:
dividing said software code into selectively-sized segments responsive to a memory capacity of said communication unit; and
downloading said selectively-sized segments to said communication unit.

24. The method of claim 23 further comprising the step of:
downloading a next selectively-sized segment after execution of said downloaded transmitted one of said selectively-sized segments.

25. The method of claim 20 further comprising the step of:
receiving input from said user responsive to voice messages played by said downloaded interactive voice response application.

26. The method of claim 20 further comprising the step of:
reestablishing a subsequent connection between said communication unit and said multimedia application repository to retrieve said responsive information.

27. The method of claim 20 wherein said initial connection is implemented over a voice network and said downloading step is implemented over a data network.

28. The method of claim 20 further comprising the step of:
establishing communication between said user and an operator responsive to a request made pursuant to said downloaded interactive voice response application.

29. The method of claim 28 wherein said communication is established using a combination of a voice network and a data network.

30. A system for implementing an interactive voice response application on a communication device comprising:
a central repository in communication with a data network;
extensible application code disposed on said central repository, said code defining an interactive voice response application;
memory disposed on said communication device for storing a copy of said extensible application code and a set of potentially responsive information, wherein said communication device downloads said copy and said set of potentially responsive information from said central repository using said data network; and
a processor disposed on said communication device for executing said copy of said extensible application code defining said interactive voice application substantially independent from said central repository, wherein said interactive voice response application provides responsive information to requests made during operation of said interactive voice response application;
wherein said responsive information is obtained from said central repository when said responsive information is not contained in said set of potentially responsive information.

31. The system of claim 30 further comprising voice processing logic to process input spoken by a user into said communication device.

32. The system of claim 30 further comprising:
application management software disposed on said central repository for dividing said extensible application code into selectively-sized sub-modules, wherein said selected size is determined from memory limitations of said communication device.

33. The system of claim 32 wherein said communication device downloads a next sub-module after completing execution of a current sub-module.

34. The system of claim 30 wherein said communication device initiates said download of said copy by communicating with said central repository using a voice network.

35. The system of claim 30 further comprising:
a connection resource for connecting a user to an agent responsive to said requests made in executing said interactive voice application, wherein said connection allows live voice communication between said user and said agent.

36. The system of claim 35 wherein said connection resource connects said user and said agent using a combination of said data network and a voice network.

37. A method for providing an interactive voice response application to a user on a communication unit comprising the steps of:
launching a connection between said communication unit and a multimedia application repository;
downloading to said communication unit from said multimedia application repository, application code defining a downloaded interactive voice response application and a set of potentially responsive information;
running said application code on said communication unit to execute said downloaded interactive voice response application so that said user can have a voice response interactive session controlled, at least in part, by said downloaded application code; and
obtaining responsive information from said multimedia application repository when said responsive information is not found in said set of potentially responsive information.

38. The method of claim 37 wherein said communication unit retrieves said responsive information from one of an internal database to said communication unit and an external database to said communication unit.

39. The method of claim 37 wherein said connection between said communication unit and said multimedia application repository comprises a data socket connection.

40. A method for obtaining multimedia information on a communication device using a locally executed interactive voice application, said method comprising the steps of:
initiating said communication device to receive an interactive voice response session;
receiving application logic defining an interactive voice application from an application repository into said communication device to locally execute said interactive voice response session;
receiving a set of potentially responsive multimedia information to said communication unit from said application repository;
observing multimedia prompts on said communication device provided by said interactive voice response session;
providing said interactive voice response session multimedia input responsive to said observed multimedia prompts, wherein said multimedia input is processed by said communication device; and observing responsive multimedia information on said communication device provided by said interactive voice response session responsive to said processed multimedia input, wherein said responsive multimedia information is obtained from said application repository when said responsive multimedia information is not found in said set of potentially responsive multimedia information.

41. The method of claim 40 wherein said multimedia prompts comprise one of aural segments presented over an audio transducing mechanism of said communication device and visual information presented using a visual display of said communication device.

42. The method of claim 40 wherein said multimedia prompts comprise a combination of aural segments presented using an audio transducing mechanism and visual information presented using a visual display.

43. The method of claim 40 wherein said multimedia input is chosen from the group comprising:
speech;
dual tone multiple frequency (DTMF) signals; and
text.

44. The method of claim 40 wherein said multimedia information comprises one of aural segments presented over an audio transducing mechanism of said communication device and visual information presented using a visual display of said communication device.

45. The method of claim 40 further comprising the step of selectively forwarding said multimedia information to another communication device.

46. An interactive voice response system comprising:
an application repository having information stored thereon;
a communication device for establishing at least one connection with said application repository, wherein a set of potentially responsive information and an application logic is downloaded to said communication device, said application logic for defining at least one voice response application and for providing responsive information to requests made pursuant to said at least one voice response application; and
a processor within said communication device to execute said application logic and locally execute said at least one voice response application, wherein said responsive information is obtained from said application repository when said set of potentially responsive information does not contain said responsive information.

47. The system of claim 46 wherein said application repository downloads said application logic to said communication device responsive to one of said established at least one connection.

48. The system of claim 47 wherein said application repository divides said at least one voice response application into one or more selectively-sized, executable sub-modules, wherein said size is selected responsive to memory limitations of said communication device.

49. The system of claim 48 wherein said communication device obtains one of said one or more sub-modules for execution.

50. The system of claim 49 wherein said communication device obtains a next one of said one or more sub-modules after completing execution of said one sub-module.

51. The system of claim 46 wherein said communication device establishes another connection with another application in the application repository responsive to said responsive information retrieved by said application repository, said another application in the application repository having another application logic stored thereon defining at least one other voice response application for execution on said communication device, and wherein said application repository downloads said another application in the application logic to said communication device.

52. The system of claim 46 further comprising:
translation logic for converting said responsive information into a format compatible with said application logic.

53. The system of claim 46 further comprising:
a user interface disposed on said communication device for accepting input from a user responsive to said at least one voice response application.

54. The system of claim 53 wherein said processor processes said user input locally according to said at least one voice response application.

55. The system of claim 54 further comprising voice recognition logic.

56. The system of claim 55 wherein said voice recognition logic is disposed on said application repository and wherein said voice recognition logic receives digital voice packets from said communication device.

57. The system of claim 53 further comprising:
an audio transducer disposed on said communication device for playing aural segments to said user in accordance with the operation of said at least one voice response application; and
a display disposed on said communication device for presenting visual information to said user in accordance with the operation of said at least one voice response application.

58. The system of claim 57 wherein said responsive information is presented on said communication device according to a set of preferences preselected by said user.

59. The system of claim 53 wherein said communication device initiates said at least one connection with said application repository over a voice connection and receives said responsive information and application logic over a data connection.

60. The system of claim 59 wherein said voice connection comprises a circuit switched network and said data connection comprises a packet switched network.

61. The system of claim 53 wherein said communication device communicates with said application repository using a blended voice and data network.

62. The system of claim 46 wherein said application logic comprises VoiceXML.

63. A method for providing an interactive voice response application to a user on a communication unit comprising the steps of:
establishing an initial connection between said communication unit and a multimedia application repository;
transmitting software code defining said interactive voice response application and a set of potentially responsive information to said communication unit from said multimedia application repository;
executing software code on said communication unit to run said transmitted interactive voice response application; and
providing responsive information to said user responsive to requests made pursuant to said transmitted interactive voice response application, wherein said responsive information is obtained from said multimedia application repository when said responsive information is not found in said set of potentially responsive information.

64. The method of claim 63 wherein said multimedia application repository obtains said responsive information from one of an internal database and a data network.

65. The method of claim 64 further comprising the step of:
converting said responsive information into a format compatible with said interactive voice response application.

66. The method of claim 63 wherein said transmitting step further comprises the step of:
dividing said software code into selectively-sized segments responsive to a memory capacity of said communication unit.

67. The method of claim 66 further comprising the step of:
transmitting a next selectively-sized segment after execution of said transmitted segment.

68. The method of claim 63 further comprising the step of:
receiving input from said user responsive to voice messages played by said interactive voice response application.

69. The method of claim 68 further comprising the step of processing said voice input.

70. The method of claim 69 wherein said voice processing is done by said communication device.

71. The method of claim 63 further comprising the step of:
reestablishing a subsequent connection between said communication unit and said multimedia application repository to retrieve said responsive information.

72. The method of claim 63 wherein said initial connection is implemented over a voice network and said transmitting step is implemented over a data network.

73. The method of claim 63 further comprising the step of:
establishing communication between said user and an operator responsive to a request made pursuant to said interactive voice response application.

74. The method of claim 73 wherein said communication is established using a combination of a voice network and a data network.

75. A system for obtaining multimedia information on a communication device using a locally executed interactive voice application, said system comprising:
means for initiating said communication device to receive an interactive voice response session, wherein said interactive voice response session is defined by application logic received on said communication device;
means for downloading a set of potentially responsive information to said communication device from an application repository;
means for displaying multimedia prompts on said communication device provided by said interactive voice response session;
means for receiving multimedia input responsive to said multimedia prompts, wherein said multimedia input is processed by said application logic on said communication device; and
means for presenting responsive multimedia information on said communication device provided by said interactive voice response session responsive to said processed multimedia input, wherein said responsive multimedia information is retrieved from said application repository when said responsive multimedia information is not found in said set of potentially responsive information.

76. The system of claim 75 further comprising:
means for receiving said application logic into said communication device to locally execute said interactive voice response session.

77. The system of claim 75 wherein said multimedia prompts comprise one of aural segments presented over an audio transducing mechanism of said communication device and visual information presented using a visual display of said communication device.

78. The system of claim 75 wherein said multimedia prompts comprise a combination of aural segments presented using an audio transducing mechanism and visual information presented using a visual display.

79. The system of claim 75 further comprising the step of storing said obtained multimedia information onto said communication device to provide access to said obtained multimedia information substantially independent from said interactive voice response session.

80. The system of claim 75 further comprising the step of selectively forwarding said multimedia information to another communication device.

* * * * *